(12) United States Patent
McAteer et al.

(10) Patent No.: US 9,582,489 B2
(45) Date of Patent: Feb. 28, 2017

(54) ORTHOGRAPHIC ERROR CORRECTION USING PHONETIC TRANSCRIPTION

(71) Applicant: International Business Machines Corporation, Armonk, NY (US)

(72) Inventors: Seamus R. McAteer, Navan (IE); Daniel J. McCloskey, Dublin (IE); Mikhail Sogrin, Kildalkey (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/968,175

(22) Filed: Dec. 14, 2015

(65) Prior Publication Data

US 2016/0179774 A1 Jun. 23, 2016

(30) Foreign Application Priority Data

Dec. 18, 2014 (GB) .................................. 1422587.4

(51) Int. Cl.
*G10L 15/26* (2006.01)
*G06F 17/27* (2006.01)

(52) U.S. Cl.
CPC .................................. *G06F 17/273* (2013.01)

(58) Field of Classification Search
CPC ....... G10L 15/26; G10L 15/178; G10L 15/10; G06F 17/273
USPC .................................... 704/235, 9, 238, 239
See application file for complete search history.

(56) References Cited

U.S. PATENT DOCUMENTS

| 6,049,594 A * | 4/2000 | Furman ............... H04M 3/4931 379/223 |
| 6,581,034 B1 * | 6/2003 | Choi ..................... G06F 17/273 704/10 |
| 7,831,911 B2 | 11/2010 | Ramsey |
| 7,912,716 B2 | 3/2011 | McCuller |
| 8,341,520 B2 | 12/2012 | Iakobashvili et al. |
| 8,626,696 B2 | 1/2014 | Lambov |
| 8,751,230 B2 | 6/2014 | Saffer |
| 2005/0060138 A1 * | 3/2005 | Wang ..................... G06F 3/018 704/1 |

(Continued)

OTHER PUBLICATIONS

Galescu, Lucian et al., "Bi-directional Conversion Between Graphemes and Phonemes Using a Joint N-gram Model", CiteSeerX, http://citeseerx.ist.psu.edu/viewdoc/summary?doi=10.1.1.22.5445, Abstract only, (month unknown) 2001, 2 pages.

(Continued)

*Primary Examiner* — Jakieda Jackson
(74) *Attorney, Agent, or Firm* — Stephen R. Tkacs; Stephen J. Walder, Jr.; William J. Stock

(57) ABSTRACT

This illustrative embodiments provide a mechanism for correcting a phonetically sourced spelling mistake. The mechanism receives a language text string comprising at least one spelling mistake word and transcribes the at least one spelling mistake word into a phonetic form of the spelling mistake word using a phonetic dictionary. The mechanism locates a correctly spelled phonetic form from a phonetic form dictionary having shortest edit distance between characters of the correctly spelled phonetic form word and the phonetic transcription whereby the phonetic form dictionary comprises correctly spelled words and associated phonetic forms of the correctly spelled words. The mechanism substitutes the correctly spelled word for the spelling mistake word in the text string.

20 Claims, 7 Drawing Sheets

(56) References Cited

U.S. PATENT DOCUMENTS

| | | | |
|---|---|---|---|
| 2006/0004744 A1 | 1/2006 | Nevidomski et al. | |
| 2006/0074898 A1* | 4/2006 | Gavalda | G06F 17/30684 |
| 2006/0195319 A1 | 8/2006 | Prous Blancafort et al. | |
| 2009/0287678 A1 | 11/2009 | Brown et al. | |
| 2011/0066587 A1 | 3/2011 | Ferrucci et al. | |
| 2011/0106792 A1 | 5/2011 | Robertson | |
| 2011/0125734 A1 | 5/2011 | Duboue et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2014/0373088 A1* | 12/2014 | Aggarwal | G06F 21/604 726/1 |

OTHER PUBLICATIONS

Hahn, Stefan et al., "Comparison of Grapheme-to-Phoneme Methods on Large Pronunciation Dictionaries and LVCSR Tasks", INTERSPEECH 2012, Thirteenth Annual Conference of the International Speech Communication Association, Portland, Oregon, Sep. 9-13, 2012, 4 pages.

High, Rob, "The Era of Cognitive Systems: An Inside Look at IBM Watson and How it Works", IBM Corporation, Redbooks, Dec. 12, 2012, 16 pages.

Malik, M.G.A. et al., "Finite-state Scriptural Translation", Association for Computational Linguistics, http://aclweb.org/anthology//C/C10/C10-2091.pdf, COLING 2010: Poster vol. C10-2091, Aug. 2010, pp. 791-800.

McCord, M.C. et al., "Deep parsing in Watson", IBM J. Res. & Dev. vol. 56 No. 3/4 Paper 3, May/Jul. 2012, pp. 3:1-3:15.

Sarma, Arup et al., "Context-based Speech Recognition Error Detection and Correction", Association for Computational Linguistics, Proceedings of HLT-NAACL 2004: Short Papers, May 2004, 4 pages.

Stuker, Sebastian et al., "Towards Context-dependent Phonetic Spelling Error Correction in Children's Freely Composed Text for Diagnostic and Pedagogical Purposes", Karlsruhe Institute of Technology, http://isl.anthropomatik.kit.edu/downloads/spellCorrection.pdf, Research Group 3-01 'Multilingual Speech Recognition'. Aug. 2011, 4 pages.

Yuan, Michael J., "Watson and Healthcare, How natural language processing and semantic search could revolutionize clinical decision support", IBM Corporation, developerWorks, http://www.ibm.com/developerworks/industry/library/ind-watson/, Apr. 12, 2011, pp. 1-14.

\* cited by examiner

310 Calculate edit distance between phonetic form dictionary forms PWD(n) and phonetic transcription (TW)

310.2 Locate subset of words in phoneme dictionary with the same number of phonemes using number phoneme index 310.4 For n = 1 to number of words in phonetic form dictionary subset 310.6 Array M = (n , Edit Distance Method 400A/B ( PWD (n), TW)

310.8 Next n until no more words in dictionary subset 310.10 Sort Array M by edit distance to find shortest distance and corresponding value of n 310.12 Return phonetic form dictionary PWD (n) where phonetic form has the shortest edit distance

FIGURE 3B

400A Edit distance recursive method

402A Int Recursive (string PWD, int len_PWD, string TW, int len_TW)

404A if (len_PWD==0) return len_TW 406A if (len_TW==0) return len_PWD 408A if (PWD(len_PWD-1)==TW(len_TW-1)) then cost=0 else cost=1

410A Return minimum (
 Recursive(PWD, Len_PWD-1, TW, len_TW ) +1,
 Recursive(PWD, Len_PWD  , TW, len_TW-1) +1,
 Recursive(PWD, Len_PWD-1, TW, len_TW-1) +cost)

FIGURE 4A

400B Edit distance – iterative with full matrix

402B Int Iterative (char PWD (1..m)) , char TW [1..n])

404B Declare int d [ 0..m, 0..n ] ; clear all elements in d

406B Set first column of d[ I, 0]= to ascending values 1 to m

408B Set first row of d equal to ascending values 1 to n

410B for i from 1 to n

412B for j from 1 to m

414B  If PWD (1..n) =TW[j] then
   d[i,j]= d[i-1, j-1]
 else  d[I,j]= minimum of d[i-1, j]+1  //deletion
   d[i,j-1]+1 // an insertion
   d[i-1,j-1]+1 // a substitution

416B next j, next I & return d(m,n)

FIGURE 4B

| SAMPA symbol | IPA | label | and exemplification |
|---|---|---|---|
| Vowels | | | |
| A | ɑ | script a | open back unrounded, Cardinal 5, Eng. start |
| { | æ | ae ligature | near-open front unrounded, Eng. trap |
| 6 | ɐ | turned a | open schwa, Ger. besser |
| Q | ɒ | turned script a | open back rounded, Eng. lot |
| E | ɛ | epsilon | open-mid front unrounded, C3, Fr. même |
| @ | ə | turned e | schwa, Eng. banana |
| 3 | ɜ | rev. epsilon | long mid central, Eng. nurse |
| I | ɪ | small cap I | lax close front unrounded, Eng. kit |
| O | ɔ | turned c | open-mid back rounded, Eng. thought |
| 2 | ø | o-slash | close-mid front rounded, Fr. deux |
| 9 | œ | oe ligature | open-mid front rounded, Fr. neuf |
| & | ɶ | s.c. OE lig. | open front rounded |
| U | ʊ | upsilon | lax close back rounded, Eng. foot |
| } | ʉ | barred u | open-mid back unrounded, Eng. strut |
| V | ʌ | turned v | lax [y], Ger. hübsch |
| Y | ʏ | small cap Y | |

FIGURE 5

ORTHOGRAPHIC ERROR CORRECTION USING PHONETIC TRANSCRIPTION

BACKGROUND

This invention relates to a method and apparatus for orthographic error correction using phonetic transcription.

An existing algorithm that has proven very successful in spell correction of natural language text is edit distance, which involves changing the text of an incorrectly spelled word using a minimal number of possible modifications, in order to find a correctly spelled alternative. The correctly spelled word with the lowest conversion cost, based on the number of types of modification applied, is typically considered the most likely correction.

In addition to edit distance, many spell correction approaches try to correct phonetically sourced spelling mistakes, usually by substituting portions of the incorrect word with a phonetically equivalent sequence of characters, until a correct spelling is located. For example: "ee"="ea" as in "seen" not "sean"; "ay"="ae" as in "say" not "sae"; "uff"="ough" as in "scuff" not "skough"; and "ow"="ough" as in "now" not "nough". Other methods have used acoustic hidden markov models with the similar data.

This type of processing is performed using a set of well-documented phonetic pairs, similar to those described above, which map sequences of letters that have a similar phonetic quality, or which may be described by the same phonemes in certain words. While this can be helpful in correcting errors produced by speakers who perform a similar but erroneous substitution in converting from spoken to written form (as when 'photograph' in English is misspelled as 'fotograf'), these methods are severely limited by the dependence on the knowledge of language-specific pairs of common phonetic mistakes by human authors.

While these methods have been relatively successful, there are an increasing number of cases that require a more robust method for recognizing and correcting phonetically sourced spelling errors. Scenarios such as a single piece of text combining multiple languages, or errors in output from speech to text systems, have provided a much more challenging environment for spell correction, and methods that focus on common language-specific phonetic error patterns, in human authored text, are simply not good enough.

Phonetic alphabets that allow the transcription of the sounds of human language have been developed in order to allow linguists to document human utterances in a consistent fashion. In these alphabets a single character or symbol represents a single phoneme or phonetic unit of sound. An example of such an alphabet is the International Phonetic Alphabet (IPA).

In rare cases this type of alphabet is used to write down the utterances of languages that do not have an alternative written form. There are distinct advantages in considering such resources as an alternative writing system for the purposes of NLP, and particularly for spell correction.

SUMMARY

In a first illustrative embodiment there is provided a system for correcting a phonetically sourced spelling mistake comprising: a language text string buffer for a text string including at least one spelling mistake word; a phonetic transcription engine for transcribing said spelling mistake word in an phonetic transcription using a phonetic dictionary; an edit distance engine for locating a correctly spelled phonetic form from a phonetic form dictionary having shortest edit distance between the phonetic form of the correctly spelled word and the phonetic transcription, whereby the phonetic form dictionary comprises correctly spelled words and associated correctly spelled phonetic forms; and a correction engine for substituting said correctly spelled word for said spelling mistake word in the text string.

In a second illustrative embodiment there is provided a method for correcting a phonetically sourced spelling mistake comprising: receiving a language text string comprising at least one spelling mistake word; transcribing said spelling mistake word into a phonetic transcription using a phonetic dictionary; locating a correctly spelled phonetic form from a phonetic form dictionary having shortest edit distance between the phonetic representation of the correctly spelled word and the phonetic transcription whereby the phonetic form dictionary comprises correctly spelled words and associated correctly spelled phonetic forms; and substituting said correctly spelled word for said spelling mistake word in the text string.

In one example embodiment, the phonetic representation used by the phonetic dictionary uses a multilingual alphabet. The embodiments use a phonetic alphabet such as the International Phonetic Alphabet (IPA) to facilitate correction of phonetically sourced orthographic errors in text to: a) calculate phoneme edit distance for the suggestion of alternative text that more closely represents the originally intended utterance or text, of a speaker or author; b) produce phoneme language models derived from natural language text, as a complimentary resource to an existing traditional language model, for use in scenarios with phonetically derived orthographic errors.

In another example embodiment, a plurality of correctly spelled phonetic forms having short edit distances to the spelling mistake word are located and one of these plurality of correctly spelled phoneme forms is located based on having the highest context probability using the text string and a statistical language model.

In another example embodiment, the statistical language model comprises multi-lingual phonemes as base units.

In yet another example embodiment, said text string comprises a plurality of spelling mistake words and each of the spelling mistake words is substituted with a respective correctly spelled word from the phonetic word dictionary.

In another example embodiment, the phonetic word dictionary is indexed by phoneme number or phonetic representation length for fast location of a subset of correctly spelled phoneme words having a given number of phonemes or range of phonemes.

In another example embodiment, the phonetic form dictionary is optimized for the order of characters in a word. For instance, the phonetic form dictionary is adapted as a finite-state or tree structure.

In still another embodiment, the spelling mistake word comprises any language character from one or more of: Latin, Russian, Chinese, Japanese, Arabic, Cyrillic or Brahmic characters and furthermore the spelling mistake word comprises any language characters having a phonetic quality.

Other example embodiments comprise one or more of the following applications: a) speech-to-text applications for preventing unlikely transcriptions from being generated; b) correction of orthographic errors post-speech-to-text for providing alternative spelling suggestions for words which appear morphologically feasible, but which are spelled incorrectly; c) short hand or "text-ese" translation for providing phonetic spelling suggestions for translation of phonetic shorthand languages (most difficult: every word may appear to be misspelled); and d) multilingual spell-correction for recognizing words in foreign languages that may have been marked as misspellings, and to correct these words using the same technique.

The embodiments have a quality enhancing effect on spelling process carried on outside the computer system of the illustrative embodiment. The embodiments can have an effect that operates at a machine level of a computer through a generic text or voice user input interface to the computer system (typically but not exclusively as an input system for a pervasive device).

The illustrative embodiment is an extension of a traditional spell correction mechanism that uses a parser with correctly spelled lexicons to recognize misspellings, and a corpus-based statistical language model for context. In the traditional case, suggestions for alternative spelling are produced by: a) performing various modifications to the original text of the word (insertion, deletion, substitution and transposition of characters); b) discovering which modifications result in correctly spelled words; c) ranking these suggestions based on various requirements, such as minimal edit distance or contextual relevance (via language model such as word n-grams).

The embodiments introduce a phonetic variation to cater for phonetically derived errors, where features such as minimal edit distance and contextual relevance are based on alternative phonetic transcription rather than language-specific characters: a) modifications earned out are to an alternative representation of the word (for example IPA); b) these modifications are compared to equivalent alternative transcriptions of the known-word lexicons, to discover "correctly spelled" phonetic variations. A given sequence of alternative characters may suggest several possible alternative spellings, probably indicating that the original author was aware of the correct sound of the word, but did not know the correct spelling; and c) the suggested alternatives are then ranked according to edit distance and contextual relevance as before, except that the n-gram model also uses the same alternative phonetic transcription instead of traditional orthographic forms.

The embodiments comprise the following further features:

a) Any traditional dictionary of words in a language which is used to detect misspellings in text, with the additional quality that each entry in the dictionary has data corresponding to some alternative phonetic representation in another alphabet. Consider a dictionary of English words which has been transliterated phonetically into Cyrillic or Malay characters. This is not a translation of meaning, which would be extremely expensive to produce, as would be required in the case if logographic systems (like Egyptian hieroglyphics or Chinese Hanzi characters) were used, but in this case purely an alternative spelling, which allows other characteristics of the spelling error to become amplified, potentially providing better alternative spelling corrections.

b) In the context of multilingual spell correction, the use of IPA is proposed as a language-independent representation for any instance of a), with particular benefits for usage when multiple languages are used within the same context. Since detecting the presence of a word in a dictionary involves a process of dictionary lookup, and this process is generally optimized for the order of characters in a word, such as in a finite-state or tree structure.

c) The reverse of a)/b): a dictionary of the same words in the language where the principal representation is the non-standard alphabet, the purpose of which is to optimally validate a potential spelling correction in the alternative representation. An example of this would be a dictionary of English words spelled in Arabic characters. Each entry in the dictionary has additional data corresponding to the traditional alphabetic representation, similar to a)/b), which may be used to provide output for spelling suggestions using the original alphabet.

d) As in c), where multiple possible transcriptions for any given word are possible (for example "knight" and "night" are both "naɪt" in IP A), the embodiments propose the storage of all such possible forms in the same dictionary entry. This will result in multiple potential spelling suggestions for a given phonetic representation, where the original spelling may not have been so ambiguous (for example "knigt" is more likely to be "knight" than "night"). However, multiple outputs are also likely in the default case (for example "cit" may be corrected to "cat" or "cot" just as easily). Such cases, generally would require some further processing tor disambiguation and tor this, further embodiments e), f) and g) are proposed:

e) The use of any context-sensitive or probabilistic model (such as a statistical n-gram model), for the purposes of pattern recognition in natural language text, composed of any alternative phoneme transcription to the original default orthographic representation.

f) A hybrid of edit distance approaches between the proposed method and resources listed in this embodiment, and the traditional default approach.

g) As in e), where dictionaries of type a), b), c) or d) are used tor the process of transcribing the input body of text.

Documents, paragraphs and even sentences that contain text in multiple languages are becoming more common, and provide a more challenging proposition for existing spell correction techniques. In this context, consider the output of a text-to-speech process where foreign words were used by the speaker. It would not be helpful to focus on the phoneme characteristics of one single language, and this is what existing art will do. In such cases, we may end up with over-correction of words which were actually originally correct, but the words did not match known words in the expected default language.

The following example sentence is in English, but includes some French words that have been "over-corrected" into the default language of the text. These corrections are all valid English words, but any statistical model trained on English text will flag that these words (highlighted below) are likely to be out of context.

He lived on roux day grunge, in Paris.

Therefore the embodiments comprise the following additional features:

h) The transcription of words that are identified as correctly spelled but out-of-context, into a language-independent representation such as IPA, for the purposes of identifying, by the processing of text using dictionaries such as c) and d) above, that alternative alphabetic representations exist for these words in another language, and then proposing these as alternative suggestions to the out-of-context words.

i) The use of a set of probabilistic models, such as in e) above, trained independently on appropriate bodies of text in languages other than the default for the current text, in order to discover that the sequence of IP A characters identified as out-of-context in the current text, is actually a valid contextual pattern in another language, and thereby proposing the alternative spelling for these words via dictionary-lookup of the alternative phoneme characters in the relevant dictionary for this language (as in h) above).

The above two features h) and i) can facilitate the repair of the over-correction back to the speaker's originally intended words, and will help to identify the best language-match from which to select the alternative spellings:

He lived on rue des granges, in Paris.

j) There is also the possibility that words from the surrounding context may be used to supplement this process, such as words to either side of the out-of-context sequence: "on roux day grunge, in Paris," and this may result in an alternative result that allows the correction of other words that were erroneously considered contextually relevant by the original default language model. For instance, if Paris had been pronounced as "Paree" (i.e. correct French pronunciation), the speech-to-text process may have assumed that "Parry" was intended, as in "Parry Sound, Northeastern Ontario, Canada." In this case, although "in Parry" may be a statistically relevant pattern in English, the French statistical model and phoneme—orthographic dictionary may suggest that "in Parry" be corrected to "en Paris," since that is more valid pattern in French.

k) A further feature is that the system is fine-tuned so as to optimize the best possible correction for a given input text, taking into account the phoneme pattern similarities between language combinations that are used in i) or j) above, so as to achieve a balance between the utility of correcting out-of-context patterns in the default language, and not over-correcting the portions of text that are currently accurate.

In a third aspect of the illustrative embodiments there is provided a computer program product for correcting a phonetic spelling mistake, the computer program product comprising a computer-readable storage medium having computer-readable program code embodied therewith and the computer-readable program code configured to perform all the steps of the methods.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In a fourth aspect of the illustrative embodiments there is provided a computer program stored on a computer readable medium and loadable into the internal memory of a computer, comprising software code portions, when said program is run on a computer, for performing all the steps of the method claims.

In a fifth aspect of the illustrative embodiments there is provided a data carrier aspect of the illustrative embodiment that comprises functional computer data structures to, when loaded into a computer system and operated upon thereby, enable said computer system to perform all the steps of the method claims. A suitable data-carrier could be a solid-state memory, magnetic drive or optical disk. Channels for the transmission of data may likewise comprise storage media of all descriptions as well as signal-carrying media, such as wired or wireless signal-carrying media.

BRIEF DESCRIPTION OF THE DRAWINGS

Illustrative embodiments of the present invention will now be described, by way of example only, with reference to the following drawings in which:

FIGS. 3A and 3B are flow diagrams of a phoneme edit distance context match method of the illustrative embodiment;

FIG. 4A is a flow diagram of an edit distance recursive method of the illustrative embodiment;

FIG. 4B is a flow diagram of an edit distance iterative method of an alternative method; and FIG. 5 is an example list of phoneme vowels from the International Phoneme Alphabet (IPA).

DETAILED DESCRIPTION

Figure 1:
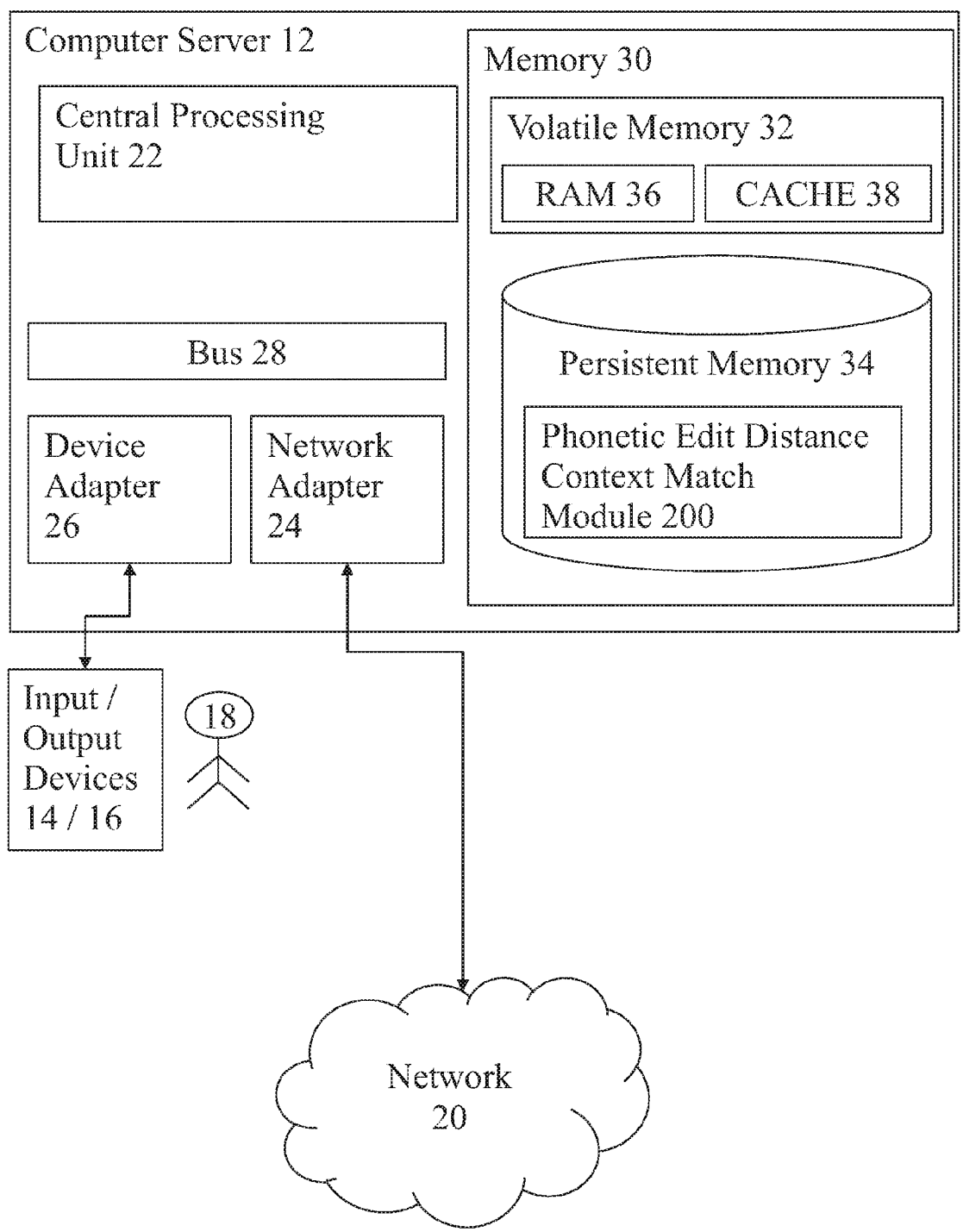
FIG. 1 is a deployment diagram, of the illustrative embodiment of a phoneme edit distance context match module.

Referring to FIG. 1, the deployment of an illustrative embodiment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment for example where a computer processing system is a third party service performed by one or more of a plurality computer processing systems. A distributed computer environment also includes an Internet of things computing environment for example where a computer processing systems are distributed in a network of objects that can interact with a computing service.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 include one or more of: a keyboard, a scanner, a mouse, trackball or another pointing device. Output devices 16 include one or more of a display or a printer. Computer processing system 10 communicates with network devices (not shown) over network 20. Network 20 can be a local area network (LAN), a wide area network (WAN), or the Internet.

Computer server 12 comprises: central processing unit (CPU) 22; network-adapter 24; device adapter 26; bus 28 and memory 30.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system, components together including memory 30 to CPU 22. Bus 28 represents one or more of any of several types of bus structures, including a memory bus or memory controller, a peripheral bus, an accelerated graphics port, and a processor or local, bus using any of a variety of bus architectures. By way of example, and not limitation, such architectures include Industry Standard Architecture (ISA) bus. Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally volatile memory is used because it is faster and generally non-volatile memory is used because it will hold the data for longer. Computer processing system 10 may further include other removable and/or non-removable, volatile and/or non-volatile computer system storage media.

By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from, or writing to a removable, non-volatile optical disk such as a compact disk (CD), digital video disk (DVD) or Blu-ray. In such instances, each can be connected to bus 28 by one or more data media interfaces. As will be farther depicted and described below, memory 30 may include at least one program product having a set (for example, at least one) of program modules that are configured to carry out the functions of embodiments of the invention.

The set of program modules configured to carry out the functions of the illustrative embodiment comprises phonetic distance context match module 200. In one embodiment, ROM in the memory 30 stores module 200 that enables the computer server 12 to function as a special purpose computer specific to the module 200. Further program modules that support the illustrative embodiment but are not shown include firmware, boot strap program, operating system, and support applications. Each of the operating system, support applications, other program modules, and program data or some combination thereof, may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Figure 2:
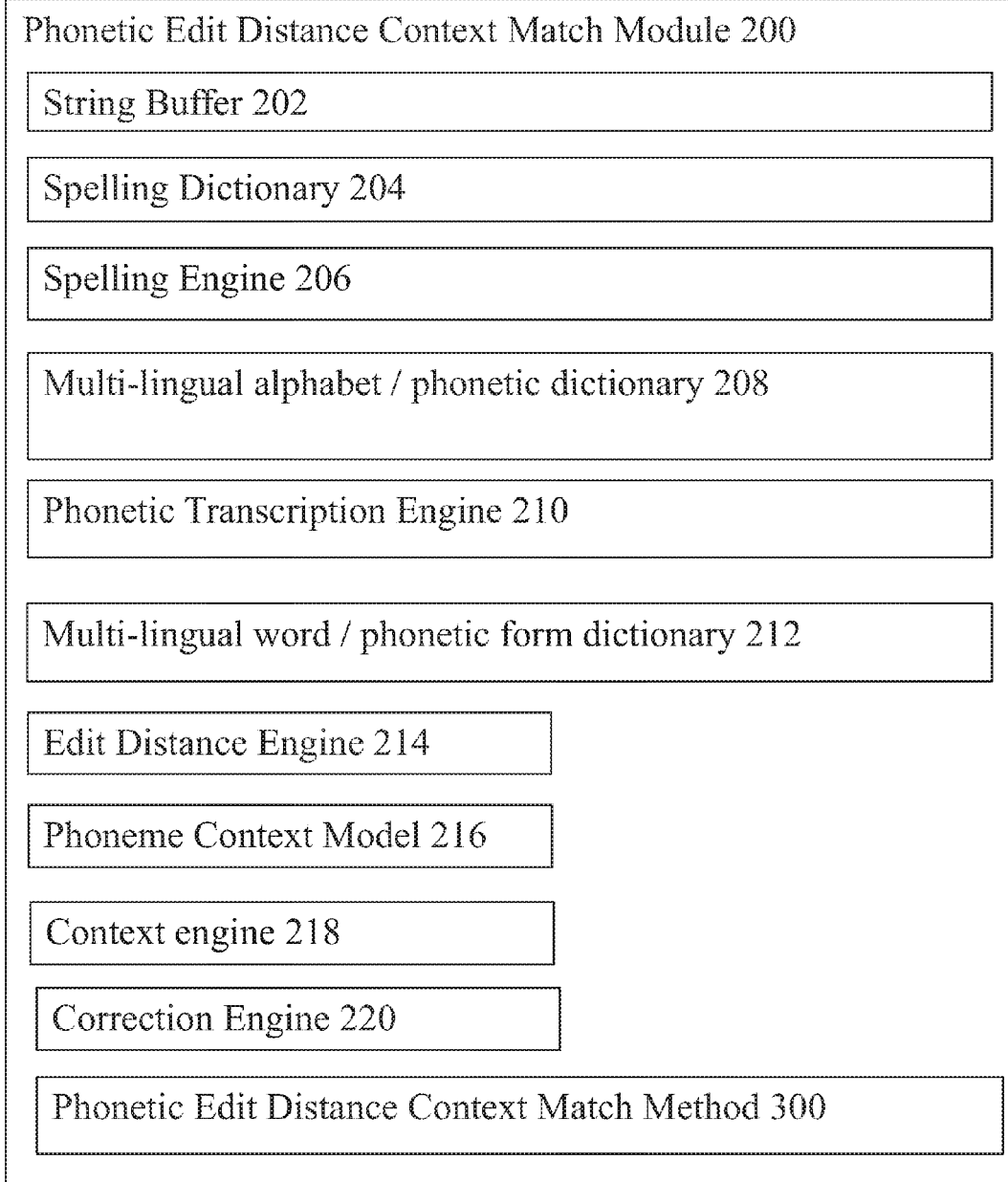
FIG. 2 is a component diagram of the illustrative embodiment of the phoneme edit distance context match module.

Referring to FIG. 2, phonetic edit distance context match module 200 comprises the following components: string buffer 202; spelling dictionary 204; spelling engine 206; multi-lingual alphabet/phonetic dictionary 208; phonetic transcription engine 210; multi lingual word/phonetic form dictionary 212; edit distance engine 214; phoneme context model 216; context engine 218; correction engine 220; and phonetic edit distance context match method 300.

String buffer 202 is for storing the text string to be corrected.

Multi-lingual spelling dictionary 204 is for storing correctly spelled words from one or more languages.

Spelling engine 206 is for identifying potential misspelled words in the string buffer 202 using multi-lingual spelling dictionary 204. Essentially if no match is found between a word in the string buffer and the spelling dictionary then it is identified as potentially misspelled.

Multi-lingual alphabet/phonetic dictionary 208 is for storing a transcription map between a phoneme alphabet and associated orthographic letters (for example the Latin character set but also Russian, Chinese, Arabic and Japanese or any spoken language character set).

Phonetic transcription engine 210 is for transcribing each misspelling word into its associated alternative phonetic representation.

Multi-lingual word/phonetic form dictionary 212 provides mapping between correctly spelled words and respective phonetic forms of those words. Spelling dictionary 204 is the set of correctly spelled words.

Edit distance engine 214 is for calculating the edit distance between the misspelled word and the phoneme forms in the dictionary 212. In the illustrative embodiment a recursive algorithm is used but other algorithms such as an iterative algorithm can be used.

Phoneme context model 216 is a phoneme model such as used in known Hidden Markov Model analysis to determine a correct spelling but in this case the model is only used to confirm a probability of potential word being the correct spelling.

Context engine 218 is for calculating the probability of a word being the correct word in the context of the other words in the string buffer.

Correction engine 220 is for correcting the misspelled word using the most probable word in the set of shortest edit distance words.

Phonetic edit distance context match method 300 is for controlling the components and for performing the process of the embodiments.

Figure 3A:
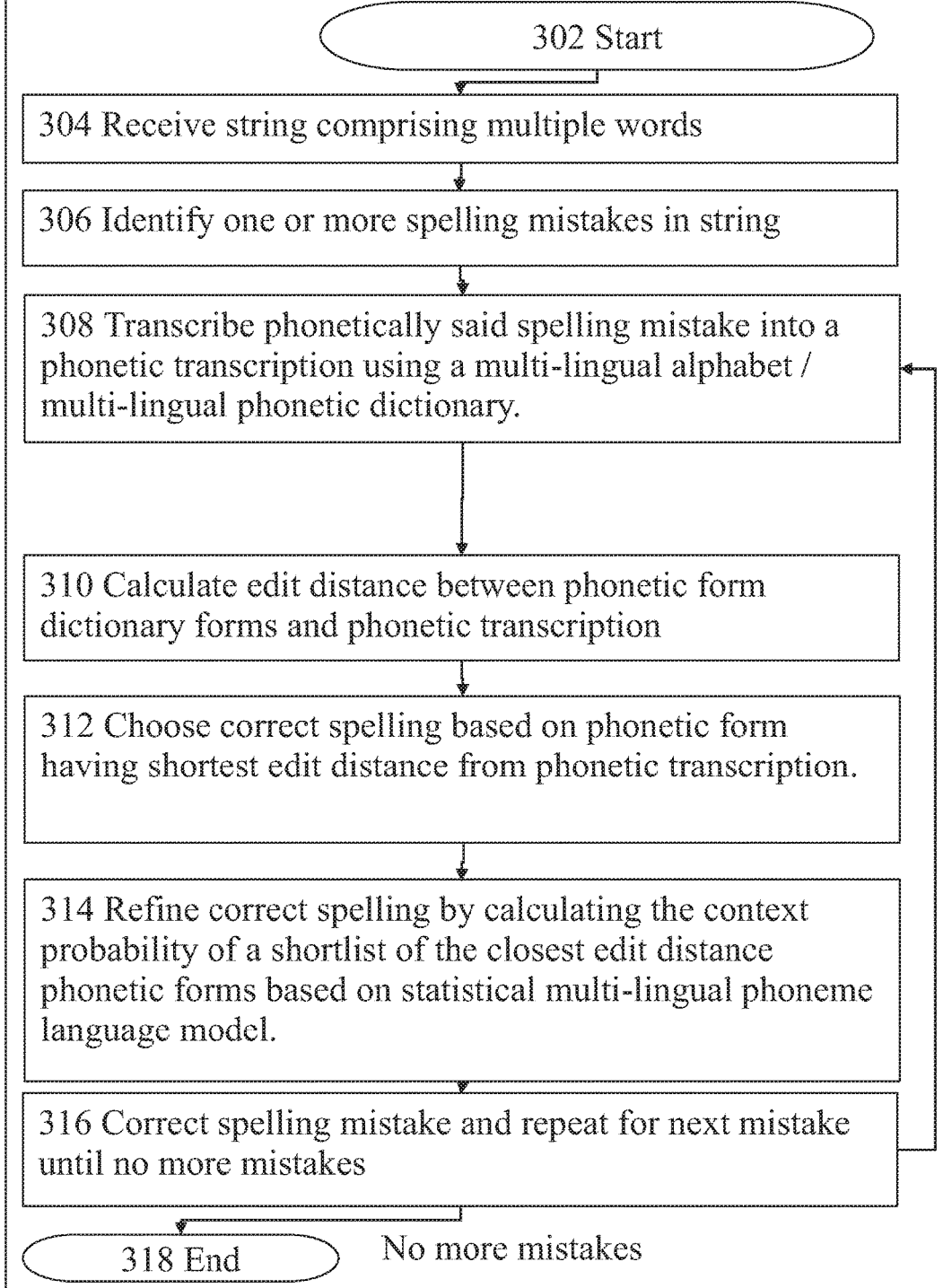

Referring to FIG. 3A, method 300 comprises logical process steps 302 to 318.

Step 302 is the start of method 300 when a user or event initiates the method on selected text.

Step 304 is for receiving a string of the selected text, potentially comprising multiple words, into the text buffer.

Step 306 is for identifying one or more spelling mistake words in string.

Step 308 is for phonetically transcribing the spelling mistake word as a phonetic transcription using multi-lingual alphabet/phonetic form dictionary 212.

Step 310 is for calculating edit distances between phonetic form dictionary entries and the phonetic transcription and comprises steps 310.2 to 310.12 of FIG. 3B. In the illustrative embodiment words in the phonetic form dictionary are tested against the phonetic transcription and edit distance is calculated by a recursive algorithm (FIG. 4A). In another embodiment phonetic forms in the phonetic form dictionary are tested against the transcribed word and the edit distance is calculated by an iterative algorithm (FIG. 4B).

Step 310.2 is for locating a subset of forms in the phonetic form dictionary with substantially the same number of phonemes as the phonetic transcription. In other embodiments the subset may contain words within plus or minus one or more of the numbers of phonemes in the transcribed word.

Step 310.4 is for defining a loop for n=1 to the number of words in the located subset of the phonetic form dictionary entries.

Step 310.6 is for setting the nth element of an array M(n) to equal the result if the edit distance algorithm with input of the phonetic form dictionary entry and the phonetic transcription word (Edit Distance Method 400A or 400B (PWD (n), TW)). See FIGS. 4A and 4B.

Step 310.8 is for looping back to step 310.6 until there are no more words in the dictionary subset.

Step 310.10 is for finding the shortest edit distances in array M and corresponding words PWD(n).

Step 310.12 is for returning phonetic form dictionary entries PWD (n) that have the shortest edit distances Step 312 is for choosing the correct spelling based on the phonetic forms having shortest edit distances from the phonetic transcription.

Step 314 is for refining the correct spelling choice by calculating the context probability of a shortlist of the closest edit distance phoneme forms based on statistical multi-lingual phoneme language model.

Step 316 is for correcting the spelling mistake and for repeating for next mistake until no more mistakes exist.

Step 318 is the end of method 300. Edit distance is approximated by the Levenshtein distance for measuring the difference between two strings of characters. The Levenshtein distance between two strings is the minimum number of single edits (insertions, deletions or substitutions) required to change one string into another.

Two methods of calculating Levenshtein distance are described below. Other variations in the Levenshtein distance algorithm, such as Damerau-Levenshtein distance, which handles the special case of adjacent transposition errors, are also applicable, in the same style as outlined below.

Referring to FIG. 4A, edit distance recursive method 400A of the illustrative embodiment comprises logical processes steps 402A to 410A.

Step 402A is for defining an integer returning recursive method "Recursive" being a function of: the phoneme diction word (string PWD), the length of PWD (int len_PWD), the transcribed word (string TW) and the length of TW (int len_TW). This method is called recursively with different values each time.

Step 404A is for returning the value of len_TW if the value of len_PWD is zero.

Step 406A is for retuning the value of len_PWD if the value of len_TW is zero.

Step 408A is for setting the variable cost to zero if the (len_PWD−1)th character of PWD is the same as the (len_TW−1)th character of TW else the cost is set to one. This return is when there is no edit distance, that is, when the characters are the same.

Step 410A is for making three recursive calls to further instances of the same method and returning the minimum of the values returned. The first call is to an instance of the recursive method that is checking for character insertion, the second call is to an instance of the recursion method that is checking for a character deletion and the third call is to an instance of the method that is checking for character substitution.

Referring to FIG. 4B, edit distance iterative method 400B of the illustrative embodiment comprises logical processes steps 402B to 416B. This edit distance is approximated by a iterative calculation of the Levenshtein distance for measuring the difference between two strings of characters.

Step 402B is for defining an function "Iterative" that returns an integer output value from inputs values phoneme dictionary word (PWD (1 . . . m)) and transcription word (TW [1 . . . n]).

Step 404B is for declaring an integer array m by n elements (int d [0 . . . m, 0 . . . n]) and clearing all the elements in the array.

Step 406B is for setting the first column of the array d to ascending values 1 to m.

Step 408B is for setting the first row of the array d to ascending values 1 to n.

Step 410B is for defining a loop i from 1 to n.

Step 412B is for defining a loop j from 1 to m.

Step 414B is for setting the element d[i, j] to d[i−1, j−1] if PWD (1 . . . n)=TW[j]; otherwise d[I, j] is set to the smallest of: d(i−1, j)+1 (a deletion); d[i, j−1]+1 (an insertion); or d[i−1, j−1]+1 (a substitution).

Step 416B is for completing the next j loop, then completing the next I loop and then returning the value at element d(m, n) representing the edit distance between the phoneme dictionary word and the transcribed word.

Referring to FIG. 5, there are shown vowels from a SAMPA phoneme alphabet that is used in prior art as a practical version of the International Phonetic Alphabet (IPA). There are multiple language-specific subsets of IPA that are configured for the requirements of each supported language in SAMPA. The SAMPA. symbols themselves are just ASCII character mappings from the original IPA character set. The SAMPA alphabet is one language-specific subset that works well with the embodiments but any alphabet with a phonetic basis can be used for an embodiment. One advantage of transcribing into an alternative phonetic form is that alternative spelling suggestions are formed and these suggestions can have an advantage on the default method. In the end, transcribing everything into Arabic characters could result in more advantageous spelling suggestions for certain types of error, in a given language. IPA and SAMBA are the most generic phonetic representation and are the illustrative embodiment. A further more flexible embodiment would be a hybrid approach using multiple phonetic representations (in IPA or any other orthographic alphabet), that can be ranked according to the combinations of (source and target) language used.

It should already be clear that the embodiments consider IPA characters independently of how they were originally intended. Where alphabets like IPA were created for the transcription of phoneme or sonic compounds in human speech, these same systems can be used as an alternative to orthographic compounds or normal spelling in text. In fact, the same purpose can be achieved using any alphabet with a phonetic basis: such as Cyrillic or Brahmic script. For the purposes of phonetic spell correction, the illustrative embodiment focuses on the set of alphabets that facilitate phonemic orthography.

The following example illustrates using edit distance to find a close homophone. Text is taken as input, probably from a speech-to-text program, which contains an underlined spelling error: "Who is currently highing medical personnel?"

One approach in prior art is to calculate edit distance between the input text and known words in a spelling dictionary and to choose the word with the least conversion cost. The word under text is "highing" and edit distances for "hugging" and "hiring" are calculated. In this example the phonetically similar word is too distant to be selected and "hugging" is chosen as the cheapest correction in terms of edit distance, where substitutions typically cost less than deletions.

1. highing–>hughing (one substitution of "u" for "i")
2. hughing–>hugging (one substitution of "h" with "g")
total cost=2 operations (2 substitutions)
1. highing–>hirhing (substitution of "g" with "r")
2. hirhing–>hiring (deletion of the second "h")
total cost=2 operations (1 substitution and 1 deletion)

In contrast, consider the same comparisons using phoneme transcription from the International Phonetic Alphabet (IPA). "Highing" transcribes to "haɪɪŋ", "hugging" transcribes to "hʌgɪŋ": and hiring transcribes to "haɪrɪŋ".

haɪrɪŋ (hiring) has only one operation required and is chosen as the cheapest correction.

1. haɪɪŋ –>hʌɪɪŋ (substitution of "ʌ" for "a")
2. hʌɪɪŋ –>hʌgɪŋ (substitution of "g" for "ɪ")
total=2 operations (2 substitutions)

1. haɪɪŋ –> haɪrɪŋ (insertion of "r" in the middle)
total cost=1 operation (1 insertion)

A further example is described in the following steps 1 to 7. The following sequence describes the embodiments applied to the sentence below, using elements from multiple claims outlined previously. Input Sentence: "The Egyptian greeted me with a phrase solemn allay come, meaning peace be upon you." This sentence has correct English words, but an over-correction of foreign words in this context.

Step 1. Take text above as input, identify words that are out of context using any traditional English language n-gram or part-of-speech statistical model.

Step 2. Transcribe these words to a common phoneme form, by performing dictionary lookup in a dictionary where the data for an alternative representation is in IPA letters:

solemn–>sə'lɛmn allay–>ə'leɪ come–>kʌm

Step 3. Perform dictionary lookup in an additional set of dictionaries prepared for various other languages, in the style of claim c) and d), whose primary representation is the alternative to the dictionary in step 2, and see if there are matches for all these words. The word for peace in Arabic السلم will have a similar phoneme pattern to sə'lɛmn above.

Step 4. If a match is found for each word, verify that the suggested pattern is valid in that particular language, by using a statistical model trained on a large body of text in that language Step 5. If, as is the case in our example, there is not a match found for every word, or for any word in the sequence, we use an algorithm like edit distance in order to find the closest matching words that exist in the language. This process has the following sub-steps:

Step 5.1 Prioritize edit distance matching in language dictionaries for which matches were already found (may reduce required processing)

Step 5.2 Try combining portions of, or entire, words for which there is no match with adjacent words in the input–>a technique that is already done in existing spell-correction engines.

From step 3, we know that (solemn–>sə'lɛmn has a match, but (allay–>ə'leɪ) and (come–>kʌm) do not. By combining the two words with no match, and performing edit distance matching on this new word, we will find the following dictionary entry:

ə'leɪkʌm –> عليكم

If a single match is eventually found for all words, go back to step 4 and assess whether or not this is a valid sequence in the language. If multiple matches are found, these must be assessed as in step 4, but the top ranked sequence should be chosen. Continue to perform edit distance matching in all language resources until a match that constitutes a valid sequence of words in the language is discovered Step 6. There is now a valid matching sequence for the words "solemn allay come" in another language, where the alternative representation is also a valid sequence of words in that language. So, the output may be corrected as follows:

"The Egyptian greeted me with a phrase السلام عليكم meaning peace be upon you."

Step 7. There is also the option of using the alternative spelling representation, stored in the dictionary, which in this case is IPA:

"The Egyptian greeted me with a phrase səˈlɛmn əˈleɪkʌm meaning peace be upon you."

Further embodiments are now described. It will be clear to one of ordinary skill in the art that all or part of the logical process steps of the illustrative embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the illustrative embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

A further alternative embodiment may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the illustrative embodiment may alternatively be embodied fully or partially in a parallel computing system comprising two or more processors for executing parallel software.

A further embodiment is a computer program product defined in terms of a system and method. The computer program product may include a computer-readable storage medium (or media) having computer-readable program instructions thereon for causing a processor to carry out aspects of the illustrative embodiments.

The computer-readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fibre-optic cable), or electrical signals transmitted through a wire.

Computer-readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program, instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium, having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

The invention claimed is:

1. A system for correcting a phonetically sourced spelling mistake comprising:
    a processor; and
    a memory coupled to the processor, wherein the memory comprises instructions which when executed by the processor cause the processor to implement phonetic edit distance context match module for correcting a phonetic spelling mistake, the phonetic edit distance context match module comprising:
    a language text string buffer for receiving a text string including a spelling mistake word;
    a phonetic transcription engine executing on the processor for transcribing the spelling mistake word into a phonetic transcription using a phonetic dictionary;
    an edit distance engine executing on the processor for determining a set of correctly spelled phonetic forms from a phonetic form dictionary having shortest edit distances between the correctly spelled phonetic forms and the phonetic transcription, wherein the phonetic form dictionary comprises correctly spelled words and associated phonetic forms;
    a context engine executing on the processor for determining a context probability of each correctly spelled phonetic form being a correctly spelled word in a context of other words in the text string using a statistical language model; and
    a correction engine executing on the processor for substituting a correctly spelled word corresponding to a correctly spelled phonetic form having a highest context probability for the spelling mistake word in the text string.

2. A system according to claim 1, wherein the phonetic representation used by the dictionary uses a multilingual alphabet.

3. A system according to claim 1, wherein the statistical language model comprises multi-lingual phonemes as base units.

4. A system according to claim 1, wherein the text string comprises a plurality of spelling mistake words and each of the spelling mistake words is substituted with a respective correctly spelled word from the phonetic form dictionary.

5. A system according to claim 1, wherein the phonetic form dictionary is indexed by phoneme number for fast location of a subset of correctly spelled phoneme words.

6. A system according to claim 1, wherein the phonetic form dictionary is optimized for an order of characters in a word.

7. A system according to claim 1, wherein the spelling mistake word comprises any language character from one or more of: Latin, Russian, Chinese, Japanese, Arabic, Cyrillic or Brahmic characters.

8. A system according to claim 1, wherein the spelling mistake word comprises any language characters from a language having a phonetic basis.

9. A method, in a data processing system comprising at least one processor and at least one memory, the at least one memory comprising instructions executed by the at least one processor to cause the at least one processor to implement a phonetic edit distance context match module for correcting a phonetic spelling mistake, the method comprising:
    receiving a language text string comprising a spelling mistake word in a language text string buffer;
    transcribing, by a phonetic transcription engine executing on the at least one processor, the spelling mistake word into a phonetic transcription using a phonetic dictionary;
    determining, by an edit distance engine executing on the at least one processor, a set of correctly spelled phonetic forms from a phonetic form dictionary having shortest edit distances between the correctly spelled phonetic forms and the phonetic transcription, wherein the phonetic form dictionary comprises correctly spelled words and associated phonetic forms for the correctly spelled words;
    determining, by a context engine executing on the at least one processor, a context probability of each correctly spelled phonetic form being a correctly spelled word in a context of other words in the text string using a statistical language model; and
    substituting, by a correction engine executing on the at least one processor, a correctly spelled word corresponding to a correctly spelled phonetic form having a highest context probability for the spelling mistake word in the text string.

10. A method according to claim 9, wherein the phonetic forms used by the dictionary use a multilingual alphabet.

11. A method according to claim 9, wherein the statistical language model comprises multi-lingual phonemes as base units.

12. A method according to claim 9, wherein the text string comprises a plurality of spelling mistake words and each of the spelling mistake words is substituted with a respective correctly spelled word from the phonetic form dictionary.

13. A method according to claim 9, wherein the phonetic form dictionary is indexed by phoneme number for fast location of a subset of correctly spelled phoneme forms.

14. A method as claimed in claim 9, wherein the phonetic form dictionary is optimized for an order of characters in a word.

15. A method as claimed in claim 9, wherein the spelling mistake word comprises any language character from one or more of: Latin, Russian, Chinese, Japanese, Arabic, Cyrillic, or Brahmic.

16. A computer program product for correcting a spelling mistake, the computer program product comprising a non-transitory computer-readable storage medium having computer-readable program code embodied therewith, the computer-readable program code configured to execute on a computing device and cause the computing device to implement a phonetic edit distance context match module for correcting a phonetic spelling mistake, wherein the computer-readable program code causes the computing device to:
- receive a language text string comprising a spelling mistake word in a language text string buffer;
- transcribe, by a phonetic transcription engine executing at least one processor of the computing device, the spelling mistake word into a phoneme transcription using a phonetic dictionary;
- determine, by an edit distance engine executing at least one processor of the computing device, a set of correctly spelled phonetic forms from a phonetic form dictionary having shortest edit distances between the correctly spelled phonetic forms and the phonetic transcription, wherein the phonetic form dictionary comprises correctly spelled words and associated phonetic forms for the correctly spelled words;
- determine, by a context engine executing at least one processor of the computing device, a context probability of each correctly spelled phonetic form being a correctly spelled word in a context of other words in the text string using a statistical language model; and
- substitute, by a correction engine executing at least one processor of the computing device, a correctly spelled word corresponding to a correctly spelled phonetic form having a highest context probability for the spelling mistake word in the text string.

17. A computer program product according to claim 16, wherein the phonetic representation used by the dictionary uses a multilingual alphabet.

18. A computer program product according to claim 16, wherein the text string comprises a plurality of spelling mistake words and each of the spelling mistake words is substituted with a respective correctly spelled word from the phonetic form dictionary.

19. A computer program product according to claim 16, wherein the phonetic form dictionary is indexed by phoneme number for fast location of a subset of correctly spelled phoneme words.

20. A computer program product according to claim 16, wherein the phonetic form dictionary is optimized for an order of characters in a word.

* * * * *